Patented Nov. 4, 1952

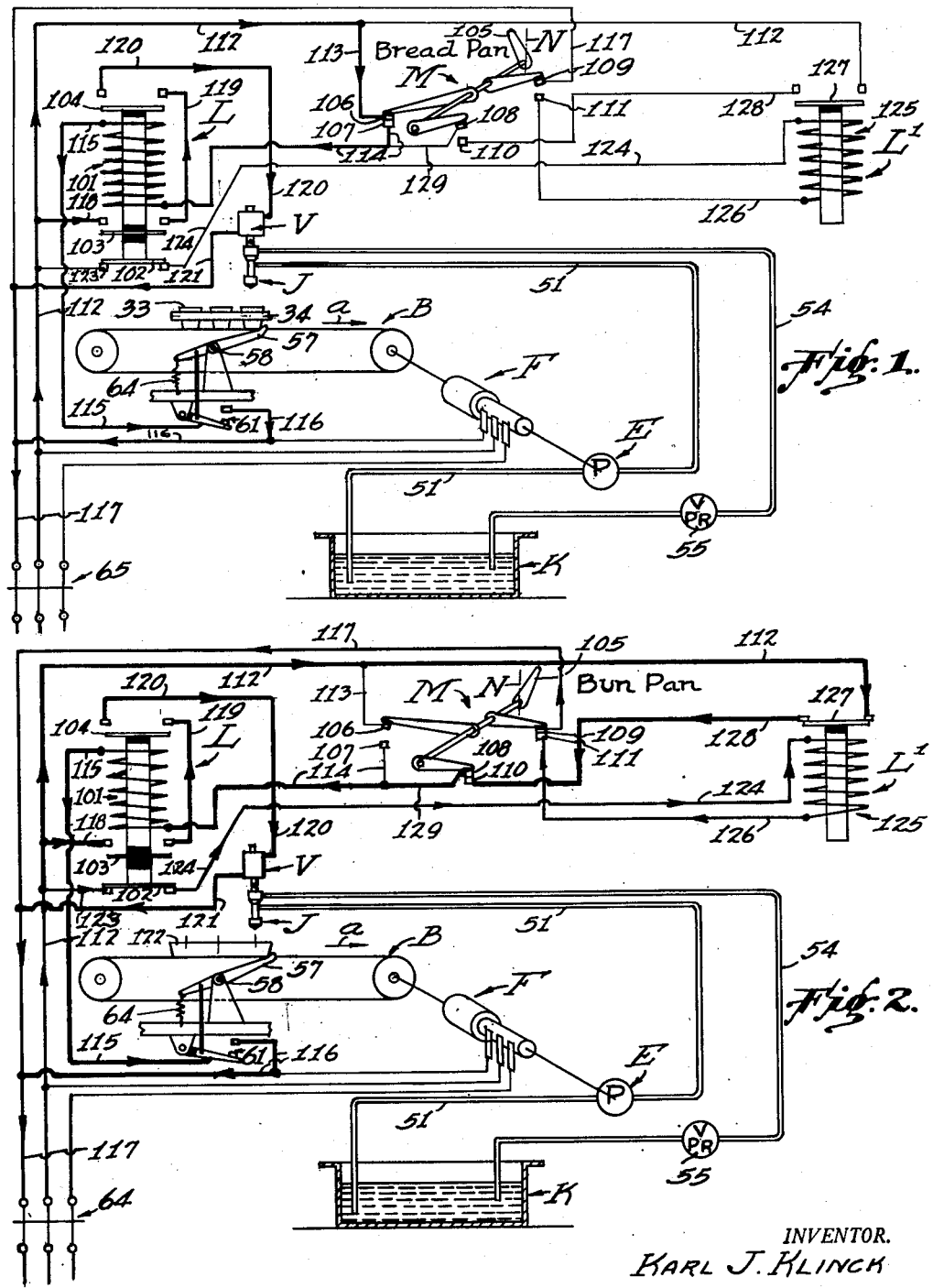

2,616,390

UNITED STATES PATENT OFFICE 2,616,390

GREASE APPLYING MACHINE FOR GREASING BUN PANS AND THE LIKE AT SPACED POINTS FOR PROVIDING UNIFORM LAYERS

Karl J. Klinck, San Gabriel, Calif.

Application August 29, 1950, Serial No. 182,066

2 Claims. (Cl. 118—2)

An object of my invention is to provide a grease applying machine for greasing bun pans and the like at spaced points for providing a uniform layer over the entire pan surface that receives the dough to be baked. My present machine is an improvement over the bread pan greasing machine shown in my copending application, Ser. No. 106,693, filed July 25, 1949, now abandoned.

In my copending case I disclose a machine for spraying a grease into bread pans for greasing the sides and bottoms of multiple pan groups used in the commercial baking of bread. The pans are fed automatically through the machine and a given quantity of grease is sprayed onto the inner surfaces of the sides and the bottoms of the pans. The machine has automatic means for delivering only the desired quantity of grease or oil to the pan when the pan is in position and then the nozzle will be shut off until the next pan is brought into proper registration with the nozzle. The pans themselves actuate the mechanism that opens the nozzle for a predetermined length of time for each actuation.

The machine shown in my copending application can take care of the automatic greasing of bread pans and I have found that it can be adapted to grease automatically, large bun pans and the like where the tripping mechanism actuated by the pan, is held continuously in operative position as the entire pan passes through the machine. If the nozzle is maintained in open position during the entire travel of the bun pan past the nozzle, too much grease is applied to the pan with the result that the dough in the pan would be fried when the pan is placed in the oven rather than baked. Furthermore, there would be an unnecessary consumption of grease.

The principal object of my invention is to adapt the bread pan greasing machine shown in my copending application to the greasing of bun pans as well as multiple bread pans. The machine will move the bun pans at a continuous and uniform speed under the nozzle and I provide novel means for causing the nozzle to open periodically to spray grease onto the pan and then to close after a predetermined quantity of grease has thus been sprayed. The amount of grease delivered for each injection can be varied and the time interval between each injection can also be varied by the operator.

Other objects and advantages will appear in the following specification, and the novel features of the device will be particularly pointed out in the appended claims.

My invention is illustrated in the accompanying drawing forming a part of this application, in which:

Figure 1 is a schematic view of the essential parts of the machine and I illustrate a wiring diagram arranged for greasing multiple bread pans;

Figure 2 is a similar view with the wiring diagram arranged for greasing bun pans.

While I have shown only the preferred form of my invention, it should be understood that various changes or modifications may be made within the scope of the appended claims without departing from the spirit and scope of the invention.

Inasmuch as my present invention makes use of all of the mechanism in my copending case, I wish the disclosure of the copending case to be the disclosure of the present one. The wiring diagram and schematic showing of certain parts in Figure 7, of the copending case, form the basis for Figures 1 and 2 of the present case. The wiring diagram and electrical equipment has been altered so that the machine can handle multiple bread pans or large bun pans.

It might be best to describe the electrical equipment first and then show how the machine can grease multiple bread pans or bun pans with such equipment. A magnetic delay relay is illustrated diagrammatically at L in both Figures 1 and 2. Both figures show the same parts. The only difference is that in Figure 1, the electrical parts are adjusted for the automatic greasing of multiple bread pans while in Figure 2, the same parts are adjusted for the automatic greasing of bun pans. The heavy lined wiring in Figure 1 traces the electrical circuits used when the machine greases multiple bread pans. The lighter lined wiring in Figure 1 is used when the machine greases bun pans.

The magnetic delay relay L in Figure 1, includes a solenoid 101 that when energized, controls the opening of switch 102 and the closing of switches 103 and 104. The switch 104 is a timed micro switch that can be adjusted to open automatically after a predetermined time period. I have found that the switch 104 should be set to open one fifth of a second after it is closed and will explain the reason hereinafter.

I provide a master control switch indicated generally at M and when the handle 105 of this switch is swung from the neutral position N to the left in Figure 1, contacts 106 and 107 will be closed while contacts 108 and 109 will be moved out of engagement with their associate contacts 110 and 111, respectively. When the contacts 106 and 107 of the switch M are closed, the electrical mechanism will be set for causing the machine to grease multiple bread pans.

Before describing the electrical circuits for the greasing of the multiple bread pans, it is best to describe the basic parts of the bread pan greasing machine shown schematically in both Figures 1 and 2. As already stated, the entire machine disclosed in my copending application is made a part of this case and only those parts are illustrated in my present case which will go toward a complete understanding of how the machine can be used for greasing bun pans as well as multiple bread pans.

A tank K is indicated in Figure 1 and this tank contains the grease or oil which is to be used for greasing the pans. A motor F is operatively connected to an oil or grease pump E and causes the pump to draw oil or grease up through a pipe 51 and deliver it to a solenoid controlled valve V which in turn controls the flow of the oil or grease under pressure to an oil nozzle J. A return oil pipe 54 leads from the valve V to a pressure relief valve 55 and thence to the tank K. Any excess oil not used by the nozzle J is returned to the tank K in this manner.

A plurality of bread pans 33 are connected together by bars 34 and are moved as a unit by an endless conveyor B under the nozzle J. The motor F is operatively connected to the conveyor B and causes it to move continuously as soon as a main switch 65 is closed. A trip lever 57 is pivoted at 58 and is connected to a switch 61 so that each time a bread pan 33 trips the lever 57, the switch 61 will be closed. When this occurs, the bread pan that trips the lever 57 will be disposed directly under the nozzle J and the electrically controlled mechanism will cause oil to issue from the nozzle to grease the pan. The oil nozzle will remain open for one fifth of a second or for any other desired predetermined time interval and then will automatically close even though the trip lever 57 still engages the bread pan. In this way only a given quantity of oil or grease will be sprayed onto the interior of the pan. As soon as the pan clears the lever 57, a spring 64 will swing the lever 57 to open the switch 61. The parts are now ready to grease the next pan 33 as soon as it trips the lever 57.

The motor F is a three phase one and the main switch 65 when closed, connects it to a source of a three phase alternating current at 220 volts. I do not wish to be confined to any particular type of motor or source of electricity. In the operation of my device for greasing multiple bread pans, the closing of the main switch 65 starts the motor F and causes the upper reach of the endless conveyor B to move in the direction of the arrow $a$. The operator throws the handle 105 of the master control switch from the neutral N position into the one where it will point to the words "Bread pan." He then places a multiple bread pan 33 on the conveyor and Figure 1 shows the first pan in the group about to depress the trip lever 57. When this is done, the oil nozzle J will be positioned above the pan. The actuation of the lever 57 by the pan will close the switch 61 and the following electric circuits will be closed:

The solenoid 101 of the magnetic delay relay will be energized by a current flowing along wire 112, Figure 1, wire 113, the closed contacts 106 and 107 of the master control switch M, wire 114, solenoid 101, wire 115, the closed switch 61, wire 116, and to the return wire 117. The energizing of the solenoid 101 will close switches 103 and 104 that in turn close a circuit to the magnetic or solenoid controlled valve V. Current will flow from the wire 112 to a wire 118 that leads to the closed switch 103, and a wire 119 carries the current to the other closed switch 104, and from there the current will flow along a wire 120 to the magnetic or solenoid operated valve V, and thence along a wire 121 to the return wire 117. The current will operate the valve V to open the nozzle J and spray oil or grease into the pan 33. The switch 104 is a timed micro switch and it is set to open one fifth of a second after it is closed. The opening of the switch 104 causes the electric circuit through the valve V to be broken and the valve will close the nozzle J.

As soon as the next bread pan 33 is moved against the trip lever 57 by the upper reach of the conveyor B, the switch 61 will again be closed and the same two electric circuits will also be closed, one of these circuits energizing the solenoid 101 to close the time-controlled switch 104 and the other circuit being completed by the closing of the switch 104 and the energizing of the magnetic valve V for opening the nozzle J and causing the latter to spray the second bread pan with a predetermined amount of grease before the nozzle is shut off. This operation is repeated for every bread pan 33 that is moved through the machine.

When it is desired to grease bun pans 122 shown in Figure 2, the master control switch M is swung from the "bread pan" position shown in Figure 1 into the "bun pan" position shown in Figure 2. The contacts 106 and 107 will be separated, while the contacts 108 and 110 will be brought into engagement with each other and also the contact 109 with the contact 111. The throwing of the switch M into this new position sets up an initial closed circuit to a demagnetized delay relay L1. The switch 102 in the magnetized delay relay L is normally closed, and therefore a current will flow from wire 112 through wire 123, switch 102 and wire 124, solenoid 125, wire 126, switch contacts 109 and 111, and to the return wire 117. The solenoid 125 is therefore energized and will close the time-controlled micro switch 127. The switch 127 is of such a type as to remain closed so long as the solenoid 125 is energized and to remain closed a predetermined time interval after the solenoid is deenergized. The time interval can be regulated.

The device is now ready to grease a bun pan 122 with a plurality of injections of grease that are made at spaced intervals. This is true even though the bun pan holds the trip lever 57 in active position to keep the switch 61 closed until the entire length of the bun pan passes by the lever. From actual practice I have found that the nozzle J should remain open for approximately one-fifth of a second and the spray of grease will cover about nine inches of the bread pan area. The nozzle J is then closed and remains closed while the bun pan is moved to bring a new section into registration with the nozzle. The elapsed time to accomplish this movement of the bun pan is approximately one-fifth of a second. The valve V will then open the nozzle J a second time to cause it to spray grease over the next area of the pan. The means for accomplishing this will be now explained. It is best to have the sprayed areas overlap each other slightly. In a bun pan that is twenty-seven inches long, the nozzle will be opened about three times and the pan will be moved so that the sprays of grease will be delivered to the pan at three different points. The entire area of the pan will be covered. The intermittent spraying of the bun pan limits the quantity of the grease sprayed onto the pan, and therefore a saving in grease will result.

Again referring to Figure 2, it will be noted that the closing of the time-controlled switch 127 by the solenoid 125 due to the master switch being swung into the bun pan position, and the subsequent closing of the switch 61 by the trip lever 57 being engaged by the bun pan 122, will cause an electric current to flow from wire 112 through the closed switch 127 and thence along a wire 128 to a closed switch formed by the contacts 108 and 110, and thence along a wire 129 to the wire 114 and the solenoid 101. From here the current will flow through the wire 115, the closed switch 61 and will pass along the wire 116 back to the return wire 117, thus completing the circuit. The solenoid 101 will be energized and will open the switch 102 while closing switches 103 and 104.

The closing of the time-controlled switch 104 will cause a circuit to flow to the valve V by means of the wire 118, the closed switch 103, wire 119, the time-controlled switch 104, wire 120, valve V and the wire 121 back to the return wire 117. The energizing of the valve V opens the nozzle J and a predetermined quantity of grease will be sprayed upon the initial portion of the bun pan. The switch 104 will open after predetermined time period such as one-fifth of a second and as soon as the switch opens, the current to the valve V is cut off and the valve will close the nozzle J. The bun pan will be carried by the conveyor B to bring a new area into position to be sprayed with grease.

It will be remembered that the energizing of the solenoid 101 opens the switch 102, while at the same time closing switches 103 and 104. The opening of the switch 102 cuts off the current to the solenoid 125 and since the switch 127 closed by the energizing of the solenoid is a time-controlled one, the switch will open after a predetermined time interval from the time the solenoid 125 is deenergized. The opening of the switch 127 stops the flow of current to the solenoid 101 because the switch is in series with the solenoid. As soon as the solenoid 101 is deenergized the switch 102 will again be closed and this will reestablish the circuit to the solenoid 125 and energize it. The energizing of the solenoid 125 again closes the switch 127 which in turn closes the circuit to the solenoid 101 and causes this solenoid to be again energized and close the switches 103 and 104 while opening the switch 102. The closing of the time-controlled switch 104 results in an electric current again flowing through the valve V to open the nozzle J for one-fifth of a second or any other predetermined time interval, and thus the next portion of the bun pan is sprayed with grease.

This cycle of operation is repeated indefinitely so long as the switch 61 remains closed by the trip lever 57 which in turn contacts the bun pan 122. The result is that the nozzle J is opened a number of times while the bun pan passes thereunder and sprays the desired quantity of grease onto the desired portions of the pan, this resulting in a uniform application of grease to the entire area of the pan. The time-controlled switch 104 determines the length of time the nozzle J remains opened while the time-controlled switch 127 determines the length of time between successive openings of the nozzle J. Both switches can be regulated to give the desired amount of grease for each opening of the nozzle and the desired length of time between openings so that pans of different areas will be uniformly greased over their entire surfaces.

After the entire bun pan has passed the trip lever 57, the spring 64 will return the lever to the position shown in Figure 2 and the switch 61 will be opened. This will cause the solenoid 101 to remain deenergized and the solenoid 125 to remain energized. The parts are now ready to grease the next bun pan. It will be seen that a simple swinging of the handle 105 of the master switch into the "bread pan" position or the "bun pan" position will change the device from opening the nozzle J one time for each bread pan 33 passing thereunder, to a plurality of times for each bun pan 122 passing thereunder.

I claim:

1. The combination with a conveyor for moving a bun pan; and a spray nozzle connected with grease under pressure for greasing the pan; of work controlled and electrically actuated means for causing the nozzle to intermittently spray the pan at a number of points as the pan is moved by the conveyor and comprising a solenoid; a trip lever actuated by the pan for closing a switch for connecting a source of current with the solenoid for energizing the solenoid; an electric valve for the nozzle; a second time-controlled switch closed by the solenoid when the latter is energized and connecting the electric valve with the source of current and causing the valve to open and permitting grease under pressure to issue from the nozzle and spray a predetermined area of the pan; said time-controlled switch opening after a predetermined time interval and causing the valve to close; a second solenoid; a third switch closed when the first-mentioned solenoid is deenergized, said third switch connecting the second solenoid with the current source for energizing the second solenoid; a fourth time-controlled switch closed by the energizing of the second solenoid and being in series with the electric circuit to the first solenoid; the third switch being opened by the energizing of the first solenoid and deenergizing the second solenoid; the fourth switch being opened after a predetermined time period after the second solenoid is deenergized and cutting off the current to the first solenoid, whereby the deenergized first solenoid will again close the third switch and energize the second solenoid which will close the fourth switch and energize the first solenoid for again temporarily closing the second time-controlled switch and opening the valve a second time for spraying a consecutive portion of the pan; this sequence of operations being followed automatically so long as the trip lever is in contact with the pan.

2. In a pan-greasing apparatus of the character described: an injection nozzle adapted to deliver grease or the like to a baking pan; means for imparting relative movement between the nozzle and the pan to expose the latter for a greasing operation; actuating means for the nozzle to selectively actuate the latter for delivering either single or a succession of injections of grease to the pan during said relative movement; and manually-controlled adjusting means to adjust the actuating means for actuation of the nozzle in the selected manner.

KARL J. KLINCK.

REFERENCES CITED

The following references are of record in the file of this patent:

UNITED STATES PATENTS

| Number | Name | Date |
| --- | --- | --- |
| 1,885,453 | Larson | Nov. 1, 1932 |
| 2,345,076 | Spencer | Mar. 28, 1944 |
| 2,400,315 | Paasche | May 14, 1946 |
| 2,453,527 | Mero | Apr. 19, 1949 |
| 2,499,621 | Archer | Mar. 7, 1950 |